United States Patent [19]
Hesslein et al.

[11] 3,820,668
[45] June 28, 1974

[54] BAR END POSITIONER

[75] Inventors: Robert J. Hesslein, Fayetteville;
Robert W. Chamberlin; Gerald B. Lanphere, both of Central Square, all of N.Y.

[73] Assignee: Lipe Rollway Corporation, Syracuse, N.Y.

[22] Filed: June 11, 1973

[21] Appl. No.: 368,715

[52] U.S. Cl.................. 214/1.5, 82/2.7, 214/1.2, 214/1.4
[51] Int. Cl............................................ B65h 5/16
[58] Field of Search ............ 214/1.1, 1.2, 1.3, 1.4, 214/1.5; 82/2.5, 2.7

[56] References Cited
UNITED STATES PATENTS

| | | | |
|---|---|---|---|
| 2,595,522 | 5/1952 | Harney | 214/1.2 X |
| 3,095,771 | 7/1963 | Vann et al. | 214/1.2 X |
| 3,360,139 | 12/1967 | Bechler | 214/1.2 X |
| 3,618,787 | 11/1971 | Nemoto | 214/1.5 |

*Primary Examiner*—Frank E. Werner
*Attorney, Agent, or Firm*—Cumpston, Shaw & Stephens

[57] ABSTRACT

A bar end positioner for face-off of a new bar is applied to a magazine bar feeder having a stock tube and a cable drive for feeding bars to a bar working machine. The bar end positioner includes a gate movable to block off the end of the stock tube and a stock stop valve for detecting the engagement of a bar end with the gate. When the stock stop valve operates, a movable clamp closes onto the cable and then the gate moves clear of the stock tube so that the cable and the bar advance until the clamp reaches a stop and the bar reaches a face-off position. This starts the bar working machine which then releases the clamp so it returns to its start position.

11 Claims, 9 Drawing Figures

BAR END POSITIONER

THE INVENTIVE IMPROVEMENT

Magazine bar feeders have been known for years for feeding bars successively to bar working machines such as screw machines, lathes, etc. Face-off positioning of the leading end of a replenishment bar has also been accomplished in various ways, usually by devices in the bar working machine itself rather than in the bar feeder.

The invention involves recognition of a simple way of accomplishing a face-off feed by an accessory to a magazine bar feeder, and the invention proposes a simple, economical, and reliable bar end positioner that is compatible with existing bar-feeding equipment. The invention also aims at speed, safety, ease of installation and maintenance, and convenience and reliability in operation of a bar end positioner.

SUMMARY OF THE INVENTION

The inventive bar end positioner is applied to a magazine bar feeder having a stock tube, means for opening and closing the stock tube, a feed cylinder, and cable driven means operated by the feed cylinder for feeding a bar in the stock tube to supply a bar working machine. The bar end positioner includes a gate movable between positions clear of and blocking the forward end of the stock tube, and pneumatic means operable upon opening of the stock tube for positioning the gate to block the forward end of the stock tube. A pneumatic stock stop valve is arranged to detect the engagement of a bar end with the gate, and pneumatic means operable upon closing of the stock tube powers the stock stop valve. A clamp is movable from a normally assumed start position for clamping onto and moving with the cable as the bar is fed, and pneumatic means responsive to operation of the stock stop valve clamps the clamp on the cable and then moves the gate clear of the stock tube to allow the feed cylinder and cable drive to advance the bar with the clamp moving with the cable. A stop is engaged by the clamp for stopping the cable drive to limit the feed of the bar end to a predetermined distance beyond the stock tube for face-off of the bar. A pneumatic face-off stop valve responds to the clamp reaching the stop for starting the bar working machine, and pneumatic means responsive to an event in the bar working machine releases the clamp which returns to its start position.

DRAWINGS

DETAILED DESCRIPTION

Figure 9:
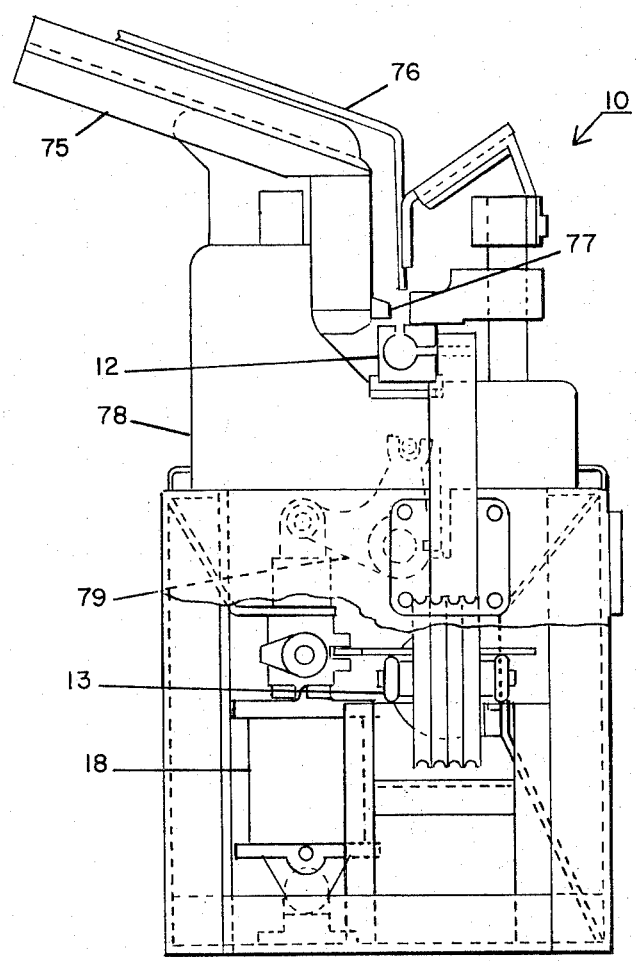
FIG. 9 is a partially schematic, front end elevational view of a bar feeder to be provided with the invention.

The inventive bar end positioner is applied to a magazine bar feeder 10 for feeding bars successively to a bar working machine 11 such as a screw machine, lathe, punch press, grinder, milling machine, etc. Bar feeder 10 generally includes a pneumatic and hydraulic control circuit 17 for carrying out basic functions which include opening and closing stock tube 12 to receive a new bar, feeding the bar along the tube by means of a feed cylinder 13, a drive cable 14, a bar pusher assembly 15, and a bar pusher collet 16 that is preferably a remnant retractor 54 to withdraw the remnant from bar working machine 11 and eject it at the rear end of bar feeder 10. A shift cylinder 18 opens and closes stock tube 12, and control circuit 17 has various regulators and safety devices for protecting bar feeder 10 and bar working machine 11 from any malfunctions. As best shown in FIG. 9, bar feeder 10 has a bar stock rack 75, a stock guide 76, a lower stock holding pin 77, and a magazine head assembly 78 for dropping successive bars into stock tube 12 as shift cylinder 18 operates stock tube shifter 79.

The inventive bar end positioner 20 is an accessory attachment receiving pneumatic inputs from bar feeder 10 to operate compatibly and in synchronization with bar feeder 10. Positioner 20 positions the leading end of a replenishment bar for a face-off cut in bar working machine 11 and then lets the bar feeding proceed in the usual way until the bar is consumed and a new bar is dropped into stock tube 12 for a new face-off cut. Generally, positioner 20 stops the leading end of a bar at the forward end of stock tube 12, and then feeds the bar end a predetermined distance into bar working machine 11 so that the bar end is properly positioned for a face-off cut. After the collet of bar working machine 11 has closed on the bar, and bar working machine 11 has started to cycle, the bar end positioner is rendered inoperative until the next face-off cut is required. The details of how this is done are described below.

Figure 1:
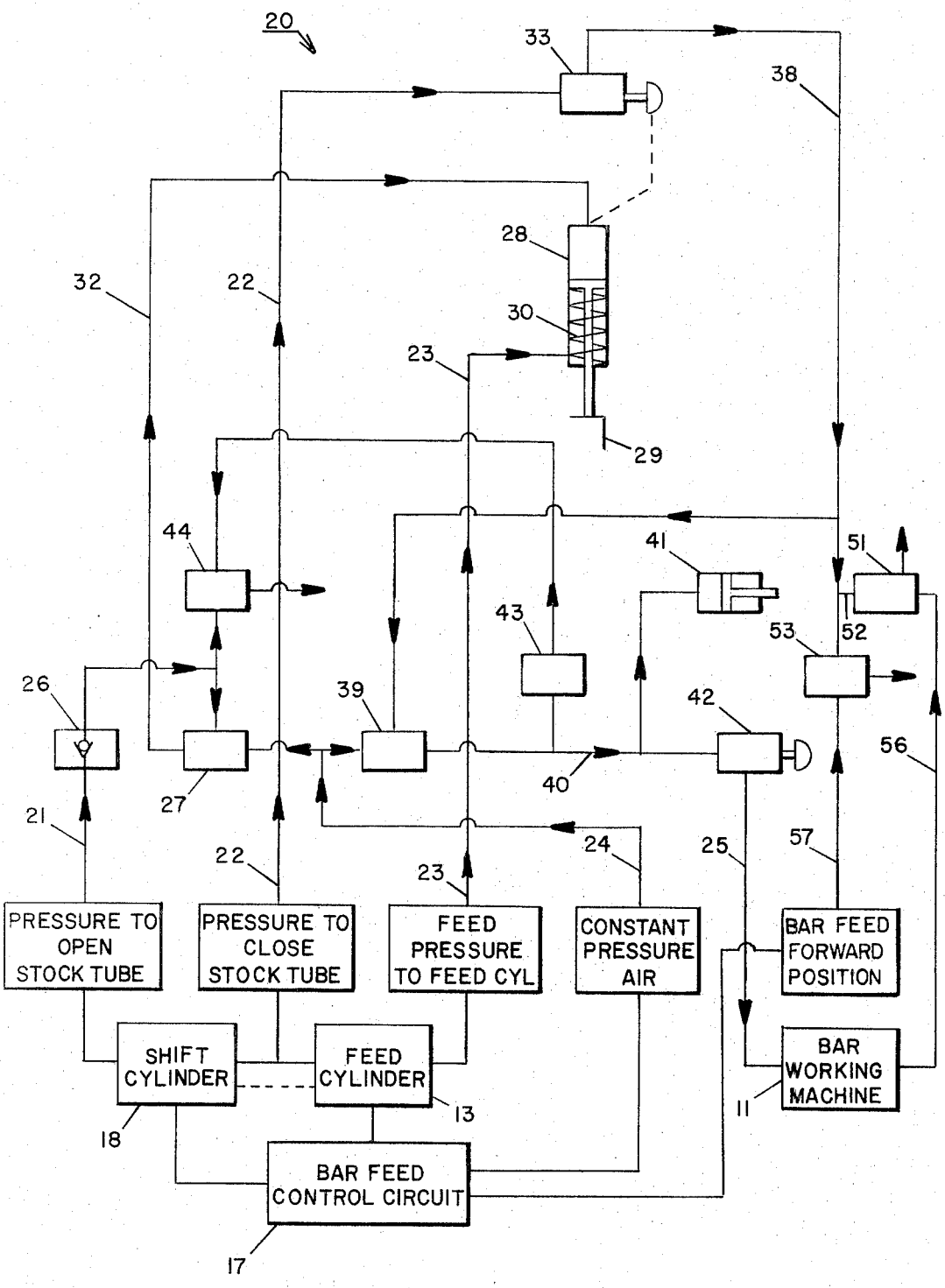
FIG. 1 is a schematic diagram of a preferred embodiment of the inventive bar end positioner.

FIG. 1 schematically shows the operation of bar end positioner 20 and the other figures show some of the preferred construction of the invention. Pneumatic inputs to positioner 20 include pressure in line 21 occurring when stock tube 12 is opened by shift cylinder 18, pressure in line 22 occurring when stock tube 12 is closed by shift cylinder 18, pressure in line 23 when feed cylinder 13 is powered to urge a bar forward and constant pressure in line 24 from feed control circuit 17. Positioner 20 produces an output air signal delivered to bar working machine 11 through line 25, and bar working machine 11 signals positioner 20 as represented by line 56 to disengage positioner 20 after face-off positioning of the bar. As a preferred safety precaution, bar working machine 11 sends another signal to positioner 20 through line 57 if bar working machine 11 is stopped with its collet open so that positioner 20 is disengaged in case any reverse flow air is applied to bar feeder 10. The effect of these inputs during a working cycle of positioner 20 is explained below.

After a bar is consumed, its remnant end is ejected either in bar working machine 11, or in bar feeder 10, and the bar pusher assembly 15 is retracted to the rear end of stock tube 12 by feed cylinder 13 and drive cable 14 so that tube 12 is ready to receive a replenishment bar. A pneumatic signal operates cylinder 18 to open stock tube 12, and this pneumatic signal is also applied through line 21 to positioner 20. The signal passes through check valve 26 which prevents any reverse flow, and it opens pilot valve 27 to admit relatively high pressure air from line 24 through valve 27 and line 32 to pressurize pneumatic cylinder 28 to drive gate 29 down to a position blocking the end of stock tube 12. Cylinder 28 is a double-acting cylinder containing an upward bias spring 30, but high pressure air applied through line 32 overcomes spring 30 and holds cylinder 28 down. Also, check valve 26 holds pilot valve 27 open, even after pressure drops in line 21, so that gate 29 remains down.

While stock tube 12 is open, bar feeder 10 drops a replenishment bar in stock tube 12, and then a pneumatic signal operates shift cylinder 18 to close stock tube 12. This causes air pressure in line 22 to power stock stop valve 33. Meanwhile, pressure is applied to feed cylinder 13 to drive bar pusher assembly 15 forward to advance the end of the bar against gate 29. When cylinder 13 is powered to advance the bar, relatively low pressure air is input through line 23 to air cylinder 28 to counter the high pressure air previously applied to cylinder 28. However, low pressure air in line 23 and spring 30 combined are not powerful enough to overcome high pressure air applied to cylinder 28 through line 32, and gate 29 stays down.

Figure 2:
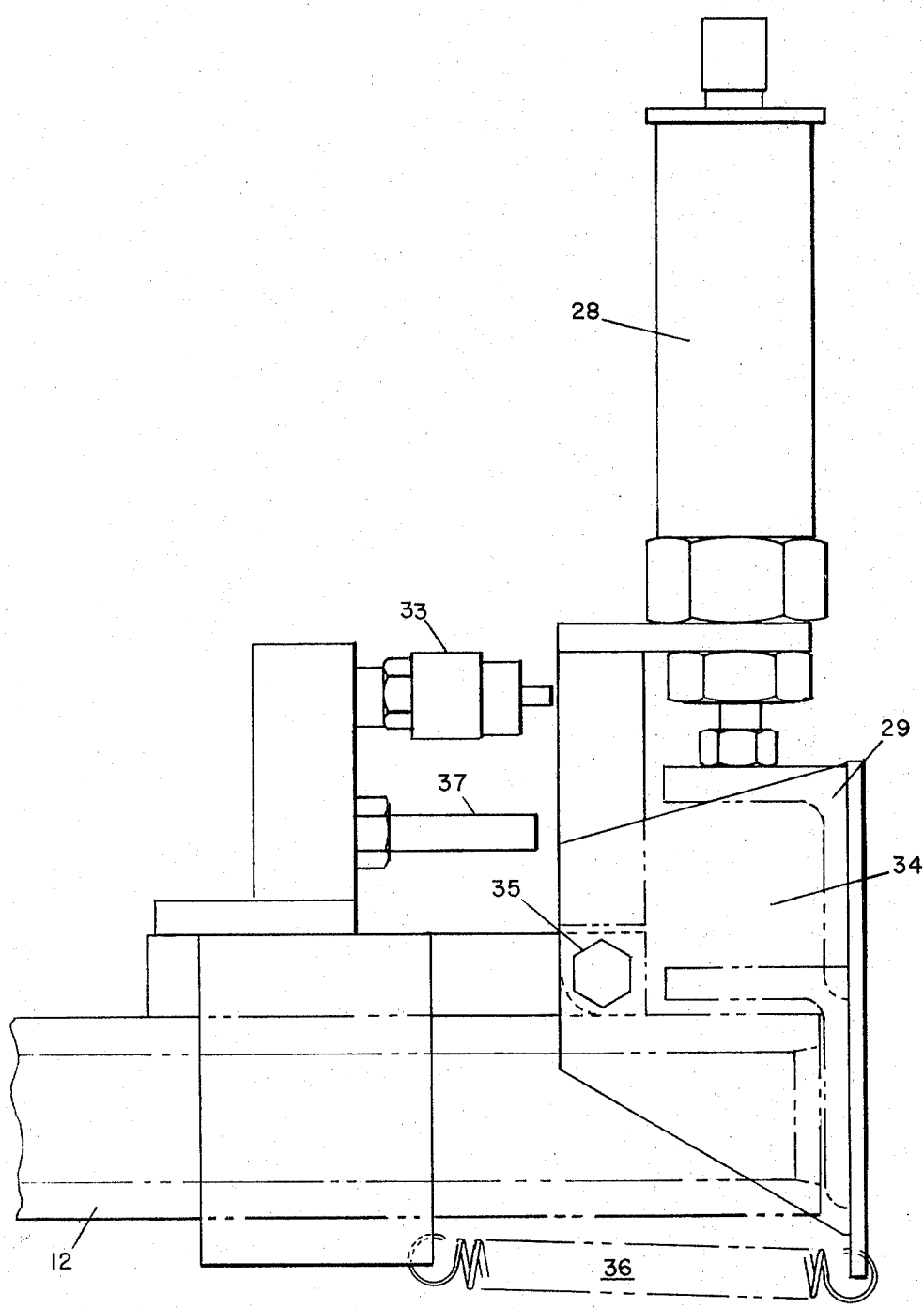
FIG. 2 is a side elevational view of a preferred embodiment of a gate for the inventive bar end positioner.

Gate 29 and cylinder 28 are mounted on a gate housing 34 that pivots slightly on axis 35 against the tension of spring 36. When the bar end strokes gates 29, it pivots housing 34 counterclockwise as illustrated in FIG. 2 to urge housing 34 against an adjustable stop 37. This operates stock stop valve 33 which was previously powered when stock tube 12 closed. When stock stop valve operates, it produces a pneumatic output in line 38 that opens pilot valve 39. This admits high pressure air from line 24 immediately through line 40 to cable clamping cylinder 41 and to power a face-off stop valve 42. Opening of pilot valve 39 also admits air through a flow regulator 43 to open pilot exhaust valve 44 which bleeds off the air trapped by check valve 26 to allow pilot valve 27 to close. This removes the high pressure air from gate cylinder 28 and allows spring 30 and low pressure air in line 23 to raise gate 29. Because of the flow regulation of regulator 43 and the bleed-off arrangement through pilot exhaust valve 44, gate 29 raises only after clamp cylinder 41 is actuated and face-off stop valve 42 is powered.

Figure 3:
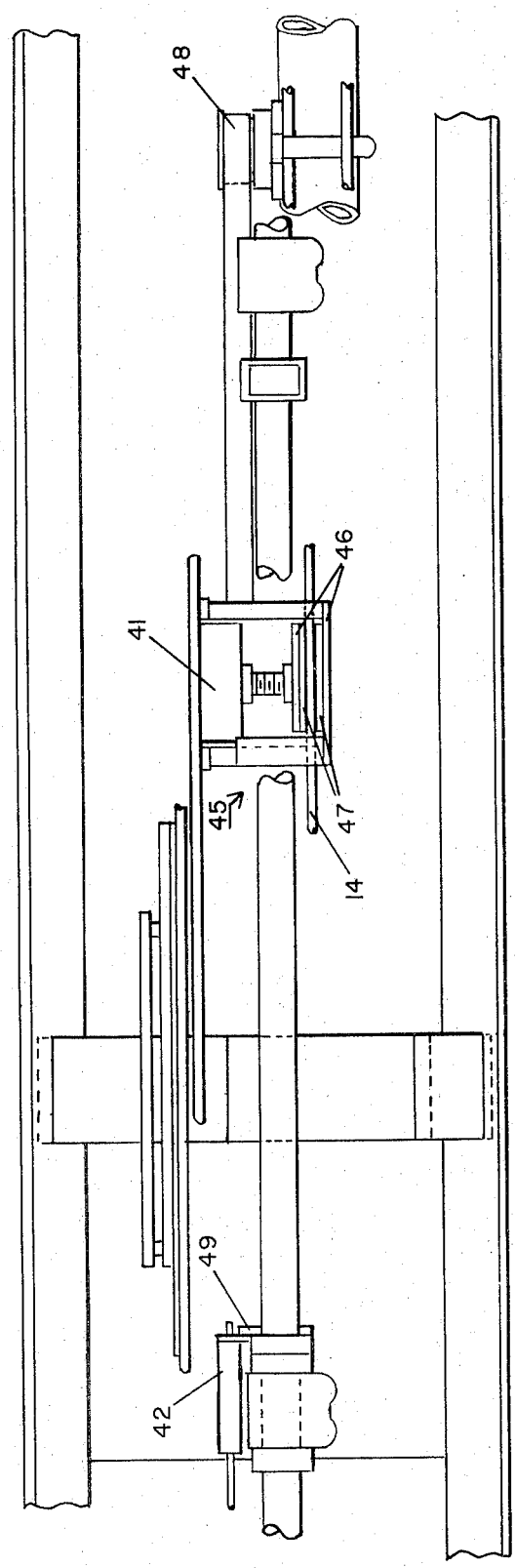
FIG. 3 is a fragmentary, plan view of a movable clamp for the inventive bar end positioner.
Figure 4:
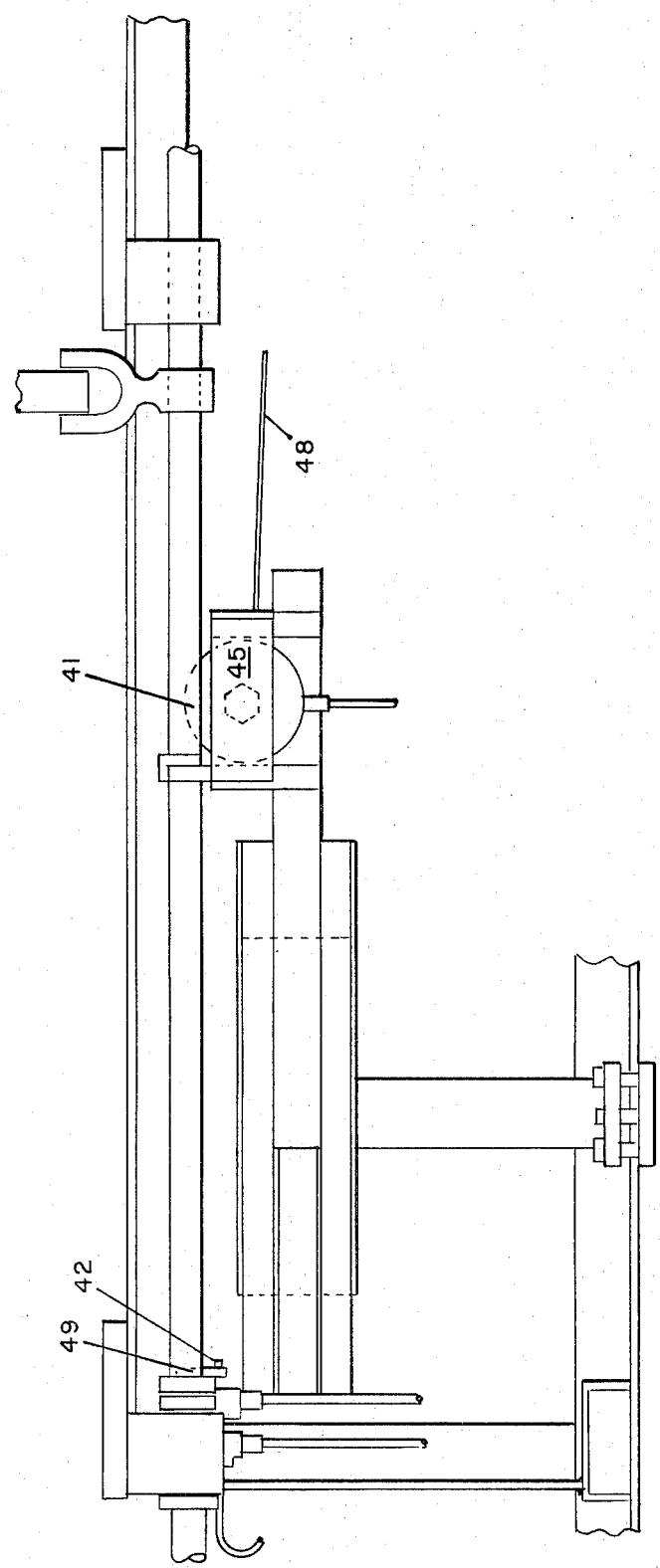
FIG. 4 is a fragmentary side elevational view of the clamp of FIG. 3.
Figure 5:
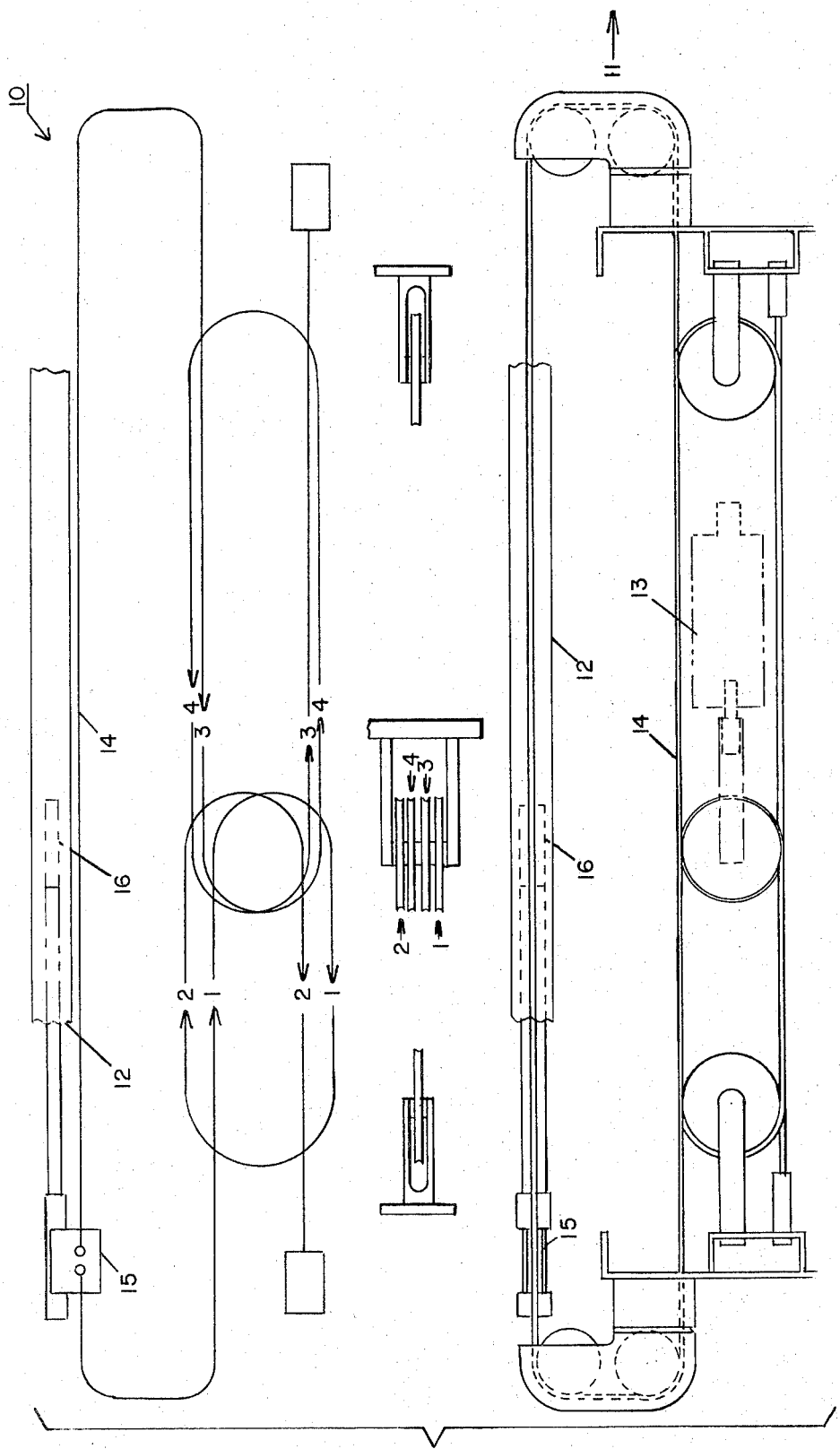
FIG. 5 is a partially schematic, elevational view of the cable drive and the pulleys and other structure applying the cable drive to a bar feeder equipped with the inventive bar end positioner.

Operation of clamp cylinder 41 closes the jaws 46 of clap 45 to grip cable 14 as best shown in FIGS. 3 and 4. Jaws 46 are preferably lined with leather 47 for a secure and undamaging grip on cable 14, and clamp 45 normally assumes a start position shown in FIG. 3 and 4 towards which it is biased by a constant tension spring 48.

As gate 29 raises, cylinder 13 advances cable 14 and bar pusher assembly 15 to drive the bar end forward of stock tube 12, and clamp 45 is secured to and moves along with cable 14 during the bar advancement. When clamp 45 reaches a stop 49, it prevents further advancement of cable 14 and stops the entire bar feeder mechanism. Stop 49 is adjustably arranged along the path of travel of clamp 45 so that when clamp 45 stops the bar feeding, the bar end is positioned for face-off in bar working machine 11.

When clamp 45 reaches stop 49, it opens face-off stop valve 42 which was previously powered. Valve 42 produces an output in line 25 which is delivered to bar working machine 11 to start up machine 11. When this occurs, machine 11 closes a collet on the bar and makes releases a face-off cut. An event in the first cycle of bar working machine 11 occurring after closing of the collet is selected to operate an exhaust valve 51 either mechanically, pneumatically, or electrically, to exhaust air from line 38 to bleed off the air from stock stop valve 33 and allow pilot valve 39 to close to return positioner 20 to a normal, inactive state. This release clamp 45 which returns to its initial position under the bias of spring 48, and it leaves gate 29 in its uppermost position under the bias of spring 30. Bar feeding then proceeds as usual while bar working machine 11 cycles until another replenishment bar is fed into stock tube 12 and the face-off cycle is repeated.

In some circumstances, such as absence of a bar in bar feeder 10, the bar feeder mechanism can reach a full forward position with positioner 20 activated and clamp 45 engaging cable 14. Reaching the full forward position activates a high-speed and powerful reverse of bar feeder 10, and this would damage clamp 45 unless it is released from cable 14. To prevent this, bar feeder 10 produces a signal in line 57 to open exhaust pilot valve 53 in parallel with exhaust valve 51 for bleeding off and inactivating positioner 20 whenever bar feeder 10 reaches its full forward position so that the subsequent reversal of bar feeder 10 will not damage positioner 20.

Figure 6:
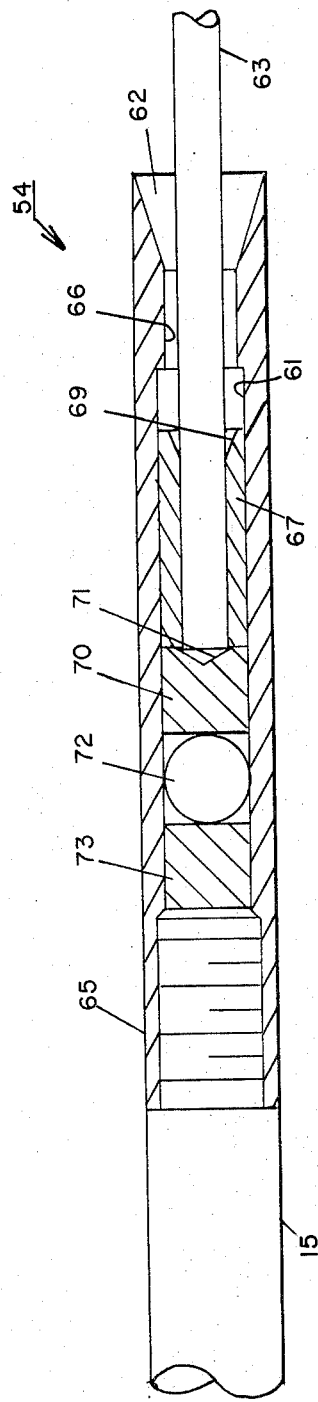
FIG. 6 is an enlarged, cross-sectional view of a remnant retractor collet for use with the invention.
Figure 8:
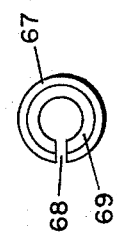
FIG. 8 is a front end elevational view of the gripping sleeve of FIG. 7.
Figure 7:
FIG. 7 is a side elevational view of a gripping sleeve in the remnant retractor collet of FIG. 6.

For remnant retraction in bar feeder 10, bar pusher collet 16 is preferably a remnant retractor collet 54 such as shown in FIGS. 6–8. Collet 54 is secured to the forward end of bar pusher assembly 15 and includes a sleeve 65 having a conical openings 62 in its forward end to receive the trailing end of bar 63 as illustrated. A bar gripper sleeve 67 is movably disposed in a bore 61 inside of sleeve 65 between a constrictive forward bore 66 and bearing blocks 70 and 73 separated by ball bearing 72. The forward end of gripper sleeve 67 has a tapered opening 69, and the forward end of bearing block 70 has a conical recess 71 to receive the trailing end of bar 63. Sleeve 67 has a longitudinal slit 68 so that it can be sprung open and closed for a firm grip on bar 63.

When collet 54 is first pushed forward the trailing end of bar 63 seats in conical opening 69 at the forward end of sleeve 68, and when the forward end of bar 63 is pushed against gate 29 as previously described, bar 63 is driven into sleeve 67 to seat against bearing block 70 as illustrated in FIG. 6. Gripper sleeve 67 with its longitudinal slit 68 springs open slightly to accommodate bar 63.

Then when the bar is consumed and collet 54 is retracted, sleeve 67 retains a grip on the trailing end of bar 63 to withdraw the remnant to the rear end of bar feeder 10 where it is pulled loose and ejected. Many other forms of remnant retractor collets can also be used with the inventive bar end positioner.

The inventive bar end positioner then reliably and accurately accomplishes all the operations necessary for feeding a replenishment bar to a face-off position without requiring any special face-off stop mechanisms in bar working machine 11. When bar feeder 10 uses a remnant retractor collet 54, bar feeder 10 also retracts the remnant end of the consumed bar and ejects it clear of bar working machine 11. Machine 11 then need only have the usual working stop and tooling for accomplishing the desired machining of the bar, and machine 11 need not be burdened with face-off stop devices or remnant ejection devices. Hence, the inventive bar positioner contributes substantially to the effectiveness and versatility of bar feeding equipment, and does so in a simple, economical, reliable, and effective way.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will appreciate the variations in control circuitry and operations possible in applying the invention to various bar feeders and bar working machines.

We claim:

1. A bar end positioner for a magazine bar feeder having a stock tube, means for opening and closing said stock tube, a feed cylinder, and cable driven means operated by said feed cylinder for feeding a bar in said stock tube to supply a bar working machine, said bar end positioner comprising:
   a. a gate movable between positions clear of and blocking the forward end of said stock tube;
   b. pneumatic means operable upon opening of said stock tube for positioning said gate to block said forward end of said stock tube;
   c. a pneumatic stock stop valve arranged to detect the engagement of a bar end with said gate;
   d. pneumatic means operable upon closing of said stock tube for powering said stock stop valve;
   e. clamp means movable from a normally assumed start position for clamping onto and moving with said cables;
   f. pneumatic means responsive to operation of said stock stop valve for clamping said clamp means on said cable means and then moving said gate clear of said forward end of said stock tube to allow said feed cylinder and cable drive means to advance said bar with said clamp means moving with said cable away from said start position;
   g. a stop engageable by said clamp means for stopping said cable driven means to limit the feed of said bar end of a pre-determined distance beyond said stock tube for face off;
   h. a pneumatic face-off stop valve responsive to said clamp means reaching said stop for starting said bar working machine;
   i. pneumatic means responsive to an event in said bar working machine for releasing said clamp means; and
   j. means for returning said clamp means to said start position.

2. The positioner of claim 1 wherein said clamp return means comprises a constant tension spring.

3. The positioner of claim 1 wherein said clamp means has leather lined jaws for gripping said cable.

4. The positioner of claim 1 including means for releasing said clamp means when said bar feeder reaches a full forward position.

5. The positioner of claim 1 including a remnant retractor collet in said bar feeding means, said collet being arranged to drive into engagement with said bar when said bar end engages said gate.

6. The positioner of claim 1 including a housing for said gate, means for pivoting said housing to allow limited movement of said gate axially of said bar, and said stock stop valve being arranged to respond to said pivotal motion of said gate housing.

7. The positioner of claim 6 wherein said gate positioning means includes a pneumatic cylinder for moving said gate laterally of said stock tube within said housing.

8. The positioner of claim 7 wherein said clamp return means comprises a constant tension spring.

9. The positioner of claim 8 wherein said clamp means has leather lined jaws for gripping said cable.

10. The positioner of claim 9 including means for releasing said clamp when said bar feeder reaches a full forward position.

11. The positioner of claim 10 including a remnant retractor collet in said bar feeding means, said collet being arranged to drive onto engagement with said bar when said bar end engages said gate.

* * * * *